United States Patent [19]
Dickerson et al.

[11] Patent Number: 5,972,581
[45] Date of Patent: Oct. 26, 1999

[54] OPAQUE DEVELOPING/FIXING MONOBATH AND ITS USE FOR PROCESSING ROOMLIGHT HANDLEABLE BLACK-AND-WHITE PHOTOGRAPHIC ELEMENTS

[75] Inventors: Robert E. Dickerson, Hamlin; Alan S. Fitterman, Rochester, both of N.Y.

[73] Assignee: Eastman Kodak Company, Rochester, N.Y.

[21] Appl. No.: 09/205,394

[22] Filed: Dec. 4, 1998

Related U.S. Application Data

[62] Division of application No. 09/046,447, Mar. 23, 1998.
[51] Int. Cl.⁶ ........................................................ G03C 5/38
[52] U.S. Cl. ................................................ 430/456; 430/419
[58] Field of Search ............................................... 430/456

[56] References Cited

U.S. PATENT DOCUMENTS

| | | | |
|---|---|---|---|
| 3,630,744 | 12/1971 | Thiers et al. | 430/602 |
| 3,684,512 | 8/1972 | Cain et al. | 430/456 |
| 3,769,015 | 10/1973 | Itoh et al. | 430/456 |
| 3,857,710 | 12/1974 | Speers | 430/456 |
| 3,867,151 | 2/1975 | Katz | 430/456 |
| 4,216,285 | 8/1980 | Miller | 430/140 |
| 4,803,150 | 2/1989 | Dickerson et al. | 430/502 |
| 4,954,425 | 9/1990 | Iwano | 430/373 |

*Primary Examiner*—Hoa Van Le
*Attorney, Agent, or Firm*—J. Lanny Tucker

[57] ABSTRACT

Black-and-white elements, such as radiographic films, can be processed in roomlight using a developing/fixing monobath composition that also includes a particulate opacifying agent, such as carbon black, that provides safelight conditions in the processing composition. The processing method is carried out quickly, that is within 120 seconds.

7 Claims, No Drawings

OPAQUE DEVELOPING/FIXING MONOBATH AND ITS USE FOR PROCESSING ROOMLIGHT HANDLEABLE BLACK-AND-WHITE PHOTOGRAPHIC ELEMENTS

RELATED APPLICATION

This application is a Division of Ser. No. 09/046,447 filed Mar. 23, 1998, Fitterman and Dickerson, and entitled AN OPAQUE DEVELOPING COMPOSITION AND ITS USE FOR PROCESSING ROOMLIGHT HANDLEABLE BLACK-AND-WHITE ELEMENTS.

FIELD OF THE INVENTION

This invention relates in general to photography and in particular to an improved method for roomlight processing of black-and-white photographic elements. More particularly, it relates to a method of roomlight processing black-and-white radiographic films using a specific opaque developing solution, and to an opaque developing/fixing monobath useful therein.

BACKGROUND OF THE INVENTION

Roentgen discovered X-radiation by the inadvertent exposure of a silver halide photographic element. In 1913, Eastman Kodak Company introduced its first product specifically intended to be exposed by X-radiation (X-rays). Silver halide radiographic films account for the overwhelming majority of medical diagnostic images. It was recognized almost immediately that the high energy ionizing X-rays are potentially harmful, and ways were sought to avoid high levels of patient exposure. Radiographic films provide viewable silver images upon imagewise exposure followed by rapid access processing.

One approach, still in wide-spread use is to coat the silver halide emulsions useful in radiographic films on both sides of the film support. Thus, the number of X-rays that can be absorbed and used for imaging are doubled, providing higher sensitivity. Dual-coated radiographic films are sold by Eastman Kodak Company under the trademark DUPLITIZED films. Films that rely entirely on X-radiation absorption for image capture are referred to in the art as "direct" radiographic elements, while those that rely on intensifying screen light emission are referred to as "indirect" radiographic elements. Because the silver halide emulsions are used to capture the X-rays directly in "direct" films, the coating coverages of such emulsions are generally higher than in other radiographic elements. A typical coverage is about 5 g of silver/$m^2$ per side of DUPLITIZED films, and twice that amount for single-side coated films.

Other radiographic films are considered "indirect" because they are used in combination with phosphor-containing X-ray intensifying screens that absorb the X-rays, and then emit light that exposes the silver halide grains in the emulsion layers.

In addition to the two broad categories noted above, there is a third category of radiographic films, most commonly used for dental intra-oral diagnostic imaging and hereafter referred to as dental films. Intra-oral dental imaging presents obvious barriers to the use of intensifying screens. Thus, dental films utilize the coated silver halide to absorb X-rays, and are therefore a form of "direct" radiographic films.

There are other applications for direct radiographic films, such as in various industrial applications where X-rays are captured in imaging, but intensifying screens cannot be used for some reason.

U.S. Pat. No. 5,370,977 (Zietlow) describes dental films having improved characteristics and containing certain tabular grain silver halide emulsions. No spectral sensitization is used in such dental films, but in order to avoid fogging the films with inadvertent light exposure, the emulsions contain what is identified as a "desensitizer" that reduces emulsion sensitivity to light. Conventional processing solutions and conditions are described for these dental films.

Other desensitizing compounds for radiographic films are described in U.S. Pat. No. 3,630,744 (Thiers et al) for reducing film sensitivity to roomlight and UV radiation. Conventional processing of these films is also described.

Double-coated indirect radiographic elements described in U.S. Pat. No. 4,803,150 (Dickerson et al) contain certain microcrystalline particulate dyes that reduce "crossover". These elements are designed for use with intensifying screens. Crossover occurs when some light emitted by the screen passes through the film support and exposes silver halide grains on the opposite side, resulting in reduced image sharpness. The noted particulate dyes absorb unwanted crossover exposure, but can be decolorized during conventional processing. Thus, a pH 10 developing solution is described for its conventional use as well as to decolorize the dyes within 90 seconds. Conventional fixing and washing follow.

It is the prevailing practice to process direct radiographic films for 3 or more minutes because of the higher silver coating coverages. Such processes typically include black-and-white development, fixing, washing and drying. Films processed in this manner are then ready for image viewing.

Photographic developing solutions containing a silver halide developing agent are well known in the photographic art for reducing silver halide grains containing a latent image to yield a developed photographic image. Many useful developing agents are known in the art, with hydroquinone and similar dihydroxybenzene compounds and ascorbic acid (and derivatives) being some of the most common. Such solutions generally contain other components such as sulfites, buffers, antifoggants, halides and hardeners. A workable pH for such solution is usually in the range of from about 10 to about 11, depending upon the developing agent and other solution components.

Fixing solutions for radiographic films are also well known and include one or more fixing agents, of which thiosulfates are most common. Such solutions generally include sulfites as antioxidants, and hardeners, and have a functional pH range of from about 4 to about 5.5.

Direct radiographic films, including dental films, thus have some sensitivity to roomlight and UV as well as X-rays, and therefore care must be taken to avoid inadvertent room-light exposure before and during processing. There has been a desire for radiographic films that are less sensitive to roomlight, and that can be handled and processed without the need for a darkroom or other special conditions. Such films would have a number of useful applications, such as dental and industrial imaging. However, conventional processing solutions and methods cannot be used to provide suitable radiographic images in such films.

"Monobath" solutions are also known in the art of photographic processing. These solutions typically require long processing times and contain components common to both developing and fixing compositions, that is a high pH and sulfite.

U.S. Ser. No. 09/956,305, filed Oct. 22, 1997, describes the use of separate developing and fixing compositions for roomlight processing roomlight-handleable films, including radiographic dental films in sequential processing steps. While those compositions represent an advance in the art, they must be separately balanced in pH in relation to each other so that the light protecting dyes and desensitizers are not deactivated prematurely. Specifically, the developing composition has a pH and sulfite concentration lower than the fixing composition. Thus, the developing composition activity is limited, and is more complicated than a "monobath" process.

A technology is needed wherein the elements can be handled and processed completely in roomlight, without the need to deactivate the dyes in the elements during fixing.

SUMMARY OF THE INVENTION

The present invention provides an advance in the art with developing/fixing monobath having a pH of from about 10 to about 12.5, and comprising:

at least 0.05 mol/l of a black-and-white developing agent, at least 0.5 mol/l of a fixing agent other than sulfite, up to 0.5 mol/l of a sulfite, and at least 0.5 weight % of a particulate opacifying agent.

This invention also provides a method for providing a black-and-white image comprising the step of:

contacting an imagewise exposed photographic silver halide element with:
an aqueous developing/fixing composition having a pH of from about 10 to about 12.5, and comprising at least 0.05 mol/l of a black-and-white developing agent, up to 0.5 mol/l of a sulfite, and at least 0.5 mol/l of a fixing agent other than sulfite, and
at least 0.5 weight % of a particulate opacifying agent that can be included within the developing/fixing composition or in a separate solution or dispersion, the method being carried out within 120 seconds, and the element comprises a support having thereon one or more layers, at least one of the layers being a silver halide emulsion layer.

In preferred embodiments, the element further comprises:

in one of the layers, a microcrystalline particulate dye that absorbs electromagnetic radiation in the visible and UV portions of the spectrum and is decolorized during the contacting step, and in each silver halide emulsion layer, a desensitizer that reduces sensitivity of the silver halide emulsion layer to electromagnetic radiation in the visible portion of the spectrum by trapping electrons generated by exposure to that electromagnetic radiation.

The present invention provides a means for processing radiographic elements in roomlight. Such films and processing would find considerable advantage for dental applications as well and some industrial uses. Thus, a conventional darkroom is unnecessary for processing. In preferred embodiments, the elements are direct radiographic films having a silver halide emulsion layer on both sides of the film support. In still more preferred embodiments, the elements are designed for roomlight handling as well.

These advantages are achieved by a unique combination of element composition and processing composition and conditions. The monobath composition of this invention combines the developing and fixing agents in a single, simple solution, and have the appropriate levels of components (such as sulfite) and pH to provide all desired features. By developing and fixing the element in the presence of a particulate opacifying agent, the opaque developing/fixing composition provides the "dark" environment for processing. The particulate opacifying agent can be a component of the developing/fixing monobath composition initially, or separately added just prior to or during development/fixing (that is, substantially simultaneous addition during the contacting step), and remains readily dispersed or soluble during use.

In the preferred embodiments, the processed element contains a particulate dye that absorbs visible and UV radiation, but not X-rays. These dyes enable roomlight handleability, but they are then decolorized during processing. In addition, further light protection is provided in the element by the presence of a silver halide desensitizer to trap electrons released by photo-exposure, but which dyes obviously are not affected by X-rays.

The processing composition and conditions used in the invention are designed to decolorize the particulate dye during development and fixing while providing rapid image formation. Development of the latent image occurs concurrently with decolorization of the particulate dye by sulfite. At the same time, the fixing agent removes the silver.

Also, in preferred embodiments, an acidic final washing solution is used after fixing to stop further development and to remove fixing agent.

DETAILED DESCRIPTION OF THE INVENTION

The present invention is useful for providing a black-and-white image in a photographic silver halide element, and preferably a radiographic film (such as a dental film). Other types of elements that can be processed using the present invention include, but are not limited to, aerial films, black-and-white motion picture films, duplicating and copy films, and amateur and professional continuous tone black-and-white films. The composition of such materials is well known in the art but specific features that make them roomlight handleable are described below in more detail.

The black-and-white developing/fixing monobath composition of this invention contains one or more black-and-white developing agents, including dihydroxybenzene and derivatives thereof, and ascorbic acid and derivatives thereof. Dihydroxybenzene and similar developing agents include hydroquinone and other derivatives readily apparent to those skilled in the art (see for example, U.S. Pat. No. 4,269,929 of Nothnagle and U.S. Pat. No. 5,457,011 of Lehr et al). Hydroquinone is preferred.

Ascorbic acid developing agents are described in a considerable number of publications in photographic processes, including U.S. Pat. No. 5,236,816 (Purol et al) and references cited therein. Useful ascorbic acid developing agents include ascorbic acid and the analogues, isomers and derivatives thereof. Such compounds include, but are not limited to, D- or L-ascorbic acid, sugar-type derivatives thereof (such as sorboascorbic acid, g-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in U.S. Pat. No. 5,498,511 (Yamashita et al), EP-A-0 585,792 (published Mar. 9, 1994), EP-A-0 573 700 (published Dec. 15, 1993), EP-A-0 588 408 (published Mar. 23, 1994), WO 95/00881 (published Jan. 5, 1995), U.S. Pat. No. 5,089,819 and U.S. Pat. No. 5,278,035 (both of Knapp), U.S. Pat. No. 5,384,232 (Bishop et al), U.S.

Pat. No. 5,376,510 (Parker et al), Japanese Kokai 7-56286 (published Mar. 3, 1995), U.S. Pat. No. 2,688,549 (James et al), U.S. Pat. No. 5,236,816 (noted above) and *Research Disclosure*, publication 37152, March 1995. D-, L-, or D,L-ascorbic acid (and alkali metal salts thereof) or isoascorbic acid (or alkali metal salts thereof) are preferred. Sodium ascorbate and sodium isoascorbate are most preferred. Mixtures of these developing agents can be used if desired.

The developing/fixing composition can also include one or more auxliary co-developing agents, which are also well known (e.g., Mason, *Photographic Processing Chemistry*, Focal Press, London, 1975). Any auxiliary developing agent can be used, but the 3-pyrazolidone developing agents are preferred (also known as "phenidone" type developing agents). Such compounds are described, for example, in U.S. Pat. No. 5,236,816 (noted above). The most commonly used compounds of this class are 1-phenyl-3-pyrazolidone, 1-phenyl-4,4-dimethyl-3-pyrazolidone, 4-hydroxymethyl-4-methyl-1-phenyl-3-pyrazolidone, 5-phenyl-3-pyrazolidone, 1-p-aminophenyl-4,4-methyl-3-pyrazolidone, 1-p-tolyl-4,4-dimethyl-3-pyrazolidone, 1-p-tolyl-4-hydroxymethyl-4-methyl-3-pyrazolidone, and 1-phenyl-4,4-dihydroxymethyl-3-pyrazolidone. Other useful co-developing agents comprise one or more solubilizing groups, such as sulfo, carboxy or hydroxy groups attached to aliphatic chains or aromatic rings, and preferably attached to the hydroxymethyl function of a pyrazolidone, as described for example, in commonly assigned and copending U.S. Ser. No. 08/694,792 filed Aug. 9, 1996, by Roussihle et al. A most preferred co-developing agent is 4-hydroxymethyl-4-methyl-1-phenyl-3-pyrazolidone.

Less preferred auxiliary co-developing agents include aminophenols such as p-aminophenol, o-aminophenol, N-methylaminophenol, 2,4-diaminophenol hydrochloride, N-(4-hydroxyphenyl)glycine, p-benzylaminophenol hydrochloride, 2,4-diamino-6-methylphenol, 2,4-diaminoresorcinol and N-(beta-hydroxyethyl)-p-aminophenol.

A mixture of different types of auxiliary developing agents can also be used if desired.

An organic antifoggant is also preferably in the developing/fixing composition of this invention, either singly or in admixture. Such compounds control the gross fog appearance in the processed elements. Suitable antifoggants include, but are not limited to, benzimidazoles, benzotriazoles, mercaptotetrazoles, indazoles and mercaptothiadiazoles. Representative antifoggants include 5-nitroindazole, 5-p-nitrobenzoylaminoimidazole, 1-methyl-5-nitroindazole, 6-nitroindazole, 3-methyl-5-nitroindazole, 5-nitrobenzimidazole, 2-isopropyl-5-nitrobenzimidazole, 5-nitrobenzotriazole, sodium 4-(2-mercapto-1,3,4-thiadiazol-2-yl-thio)butanesulfonate, 5-amino-1,3,4-thiadiazol-2-thiol, 5-methylbenzotriazole, benzotriazole and 1-phenyl-5-mercaptotetrazole. Benzotriazole is most preferred.

The developing/fixing composition can also include one or more preservatives or antioxidants. Various conventional black-and-white preservatives can be used including sulfites. A "sulfite" preservative is used herein to mean any sulfur compound that is capable of forming or providing sulfite ions in aqueous alkaline solution. Examples include, but are not limited to, alkali metal sulfites, alkali metal bisulfites, alkali metal metabisulfites, amine sulfur dioxide complexes, sulfurous acid and carbonyl-bisulfite adducts. Mixtures of these materials can also be used.

Examples of preferred sulfites include sodium sulfite, potassium sulfite, lithium sulfite, sodium bisulfite, potassium bisulfite, sodium metabisulfite, potassium metabisulfite and lithium metabisulfite. The carbonyl-bisulfite adducts that are useful include alkali metal or amine bisulfite adducts of aldehydes and bisulfite adducts of ketones. Examples of these compounds include sodium formaldehyde bisulfite, sodium acetaldehyde bisulfite, succinaldehyde bis-sodium bisulfite, sodium acetone bisulfite, β-methyl glutaraldehyde bis-sodium bisulfite, sodium butanone bisulfite, and 2,4-pentandione bis-sodium bisulfite.

Various known buffers, such as carbonates and phosphates, can be included in the composition to maintain the desired pH of from about 10 to about 12.5. Carbonate is preferred in the practice of this invention. The pH of the developing/fixing composition is preferably from about 10.5 to about 12, and more preferably from about 11 to about 12.

It is essential that a particulate opacifying agent be present during use of the developing/fixing composition. Preferably, the particulate opacifying agent is a component of the developing/fixing composition, but it can be added separately if desired. A particulate "opacifying agent" is a compound (or mixture thereof) that is dispersible in the aqueous form of the developing composition, that will absorb essentially all radiation in the UV and visible portions of the electromagnetic spectrum. Carbon black is a preferred particulate opacifying agent. Other water-insoluble but dispersible pigments or dyes, or mixtures thereof, can be formulated to provide the same effect. Once the absorption spectra of such pigments or dyes are known, a skilled artisan could fashion a combination of compounds (dye, pigments or both) that would absorb over the entire spectral range. Examples of useful particulate opacifying agents, other than carbon black, would be readily apparent to one skilled in the art, including various metal oxides that are inert towards the various chemical components of the monobath composition of this invention. Dispersions or solutions of suitable particulate opacifying agents can be obtained commercially, or readily prepared by one skilled in the art using water or a mixture of water and water-miscible solvents (such as alcohols) as the dispersion medium. Small amounts of surfactants may be used to aid in forming the dispersions.

If the particulate opacifying agent is added separately from the developing/fixing composition, it can be added in an appropriate dispersion or solution just prior to or just after contact of the element with the developing/fixing composition.

In either instance, the amount of particulate opacifying agent present in the resulting developing/fixing composition is generally at least 0.5, and preferably at least 1 weight %, and generally less than 5, and preferably less than 2 weight %. When carbon black is used as the particulate opacifying agent, it is preferably present in an amount of from about 0.5 to about 1.5 weight %.

The monobath also contains one or more fixing agents (other than a sulfite), chosen from thiosulfates (including sodium thiosulfate, ammonium thiosulfate, potassium thiosulfate and others readily known in the art), mercapto-substituted compounds (such as those described by Haist, *Modern Photographic Processing*, John Wiley & Sons, N.Y., 1979), thiocyanates (such as sodium thiocyanate, potassium thiocyanate, ammonium thiocyanate and others readily known in the art), amines and halides. Mixtures of fixing agents can be used if desired. In a preferred embodiment, a mixture of a thiocyanate (such as sodium thiocyanate) and a thiosulfate (such as sodium thiosulfate) is used. In such mixtures, the molar ratio of a thiosulfate to a thiocyanate is from about 2:1 to about 1:3, and preferably from about 1:1 to about 1:2. The sodium salt fixing agents are preferred for environmental advantages.

It is optional that the developing/fixing composition of this invention contain one or more sequestering agents that typically function to form stable complexes with free metal ions (such as silver ions) in solution, in conventional amounts. Many useful sequestering agents are known in the art, but particularly useful classes of compounds include, but are not limited to, multimeric carboxylic acids as described in U.S. Pat. No. 5,389,502 (Fitterman et al), aminopolycarboxylic acids, polyphosphate ligands, ketocarboxylic acids, and alkanolamines. Representative sequestering agents include ethylenediaminetetraacetic acid, diethylenetriaminepentaacetic acid, 1,3-propylenediaminetetraacetic acid, 1,3-diamino-2-propanoltetraacetic acid, ethylenediaminodisuccinic acid and ethylenediaminomonosuccinic acid.

The developing/fixing composition can contain other additives including various development restrainers, development accelerators, swelling control agents and stabilizing agents, each in conventional amounts. Examples of such optional components are described in U.S. Pat. No. 5,236,816 (noted above), U.S. Pat. No. 5,474,879 (Fitterman et al), Japanese Kokai 7-56286 and EP-A-0 585 792.

The essential (and some optional) components described above are present in the aqueous developing/fixing composition in the general and preferred amounts listed in Table I, all minimum and maximum amounts being approximate (that is, "about"). If formulated in dry form, the developing solutions would have the essential components in amounts readily apparent to one skilled in the art suitable to provide the liquid concentrations.

TABLE I

| Component | General Amount | Preferred Amount |
| --- | --- | --- |
| Developing agent | 50 to 500 mmol/l | 200 to 400 mmol/l |
| Co-developing agent | 0 to 30 mmol/l | 10 to 25 mmol/l |
| Antifoggant | 0 to 2 mmol/l | 1 to 2 mmol/l |
| Sulfite antioxidant | 0 to 500 mmol/l | 200 to 425 mmol/l |
| Fixing agent | 500 to 3000 mmol/l | 900 to 2000 mmol/l |

The monobath composition is prepared by dissolving or dispersing the components in water and adjusting the pH to the desired value using acids or buffers. The composition can also be provided in concentrated form, and diluted to working strength just before use, or during use. The components of the composition can also be provided in a kit of two or more parts to be combined and diluted with water to the desired strength and placed in the processing equipment. The composition can be used as its own replenisher, or another similar solution can be used as the replenisher.

Processing can be carried out in any suitable processor for a given type of photographic element. For example, for radiographic films, the method can be carried out using one or more containers or vessels for carrying out the combined development and fixing step. Thus, the processor processing container can be open to roomlight, or closed to roomlight, but a primary advantage of this invention is that the processing container or processor need not be light-tight.

In most instances, the processed element is a film sheet, but it can also be a continuous element. Each element is bathed in the opaque monobath composition for a suitable period of time.

Development/fixing is preferably, but not essentially, followed by a suitable washing step to remove silver salts dissolved by fixing and excess fixing agents, and to reduce swelling in the element. The wash solution can be water, but preferably the wash solution is acidic, and more preferably, the pH is 7 or less, and preferably from about 4.5 to about 7, as provided by a suitable chemical acid or buffer.

After washing, the processed elements may be dried for suitable times and temperatures, but in some instances the black-and-white image may be viewed in a wet condition.

Processing times and conditions for the invention are listed in the following Table II with the minimum and maximum values being approximate (that is, "about"). The total time for the method of this invention is generally at least 40, and preferably at least 60 seconds, and generally less than 120 and preferably less than 90 seconds.

TABLE II

| PROCESSING STEP | TEMPERATURE (° C.) | TIME (sec) |
| --- | --- | --- |
| Development/fixing | 15–30 | 20–60 |
| Washing | 15–30 | 20–60 |

The elements processed using the present invention are composed of a conventional flexible, transparent film support (polyester, cellulose acetate or polycarbonate) that has applied to each side one or more photographic silver halide emulsion layers. For radiographic films, it is conventional to use blue-tinted support materials to contribute to the blue-black image tone sought in fully processed films. Polyethylene terephthalate and polyethylene naphthalate are preferred film supports.

In general, such elements, emulsions, and layer compositions are described in many publications, including *Research Disclosure*, publication 36544, September 1994. *Research Disclosure* is a publication of Kenneth Mason Publications, Ltd., Dudley House, 12 North Street, Emsworth, Hampshire PO10 7DQ England.

Preferred silver halide emulsions include silver bromide and silver bromoiodide (having up to 15 mol % silver iodide). Preferred silver halide emulsions include forehardened tabular grain emulsions as described, for example, in U.S. Pat. No. 4,414,304 (Dickerson et al). These emulsions typically have thin tabular grains of predominantly silver bromide and up to 15 mol % silver iodide, an average thickness of less than about 0.3 $\mu$m, and preferably, up to 3 mol % silver iodide and an average thickness of less than about 0.2 $\mu$m. The grains are usually dispersed in forehardened colloids, such as forehardened gelatin (using a conventional hardener). The emulsions also contain conventional addenda for providing desired coating and sensitometric properties, including but not limited to, sensitizing dyes, infrared opacifying dyes, stabilizers, antifoggants, antikinking agents, surfactants, latent-image stabilizers and other materials known in the art.

In some embodiments, the radiographic films processed according to this invention can also include a thiaalkylene bis(quaternary ammonium) salt in at least one layer, to increase imaging speed by acting as development accelerators. Such elements are described in more detail in U.S. Pat. No. 5,652,086 (Brayer et al) incorporated herein by reference.

The silver halide emulsion and other layers in the elements contain conventional hydrophilic colloid vehicles (with or without peptizers or other binders), typically gelatin or gelatin derivatives. Various synthetic polymer peptizers or binders can also be used alone or in combination with gelatin or gelatin derivatives.

Each element has one or more silver halide emulsion layers on each side of the support, and the layers on each or different sides can have the same or different compositions. Thus, the silver halides in the layers can be the same or different. In one embodiment, the radiographic films have two silver halide emulsion layers on both sides of the support, with the layers closest the support containing solely silver bromide grains. The silver coverages on each or both sides of the support can be the same or different. Generally, the total silver coverage on each side is at least about 5 g Ag/m$^2$, and preferably at least about 15 g Ag/m$^2$.

Each side of the element can also include a protective overcoat, or only one side can have an overcoat layer, such a layer containing a hydrophilic colloid material and optionally any other addenda commonly (such as matting agents) used to modify the surface characteristics. The coating coverage of such layers is generally at least 0.6 g/m$^2$ of protective colloid, such as a gelatin. Conventional subbing layers can also be included to adhere the silver halide emulsion layers to the support. Other layers, such as interlayers, may be present in the element for conventional purposes, such as providing adhesion. Preferred elements contain an overcoat layer on at least one side of the support.

The total thickness of the coated layers on either or both sides of the elements can be at least 3 µm, and preferably at least 4 µm. The thickness is generally less than 7 µm, and preferably less than 6 µm.

As noted above, in preferred embodiments, the elements processed according to this invention contain one or more particulate dyes and/or one or more desensitizers to provide roomlight handleability. Such materials are thus useful if they absorb all incident electromagnetic radiation at from about 350 to about 550 nm.

Advantageously, the elements contain one or more particulate dyes as described above, that absorb electromagnetic radiation in the visible and UV regions of the spectrum. These dyes are usually placed in the overcoat layer(s), but they can be in more than one location as long as they are readily decomposed during fixing.

Such particulate dyes generally have a size to facilitate coating and rapid decolorization during processing. In general, the smaller particles are best for these purposes, that is those having a mean diameter of less than 10 µm, and preferably less than 1 µm. The particulate dyes are most conveniently formed by crystallization from solution in sizes ranging down to 0.01 µm or less. Conventional techniques can be used to prepare dyes of the desired size, including ball milling, roller milling and sand milling.

An important criterion is that such dyes remain in particulate form in hydrophilic colloid layers of photographic elements. Various hydrophilic colloids can be used, as would be appreciated by a skilled worker in the art, including those mentioned herein for various layers. Where the particulate dyes are placed in overcoat layers, the particulate dyes are generally the only component besides the binder material.

Classes of useful particulate dyes include, but are not limited to, nonionic classes of compounds such as nonionic polymethine dyes, which include the merocyanine, oxonol, hemioxonol, styryl and arylidene dyes. Anionic dyes of the cyanine class may also be useful as long as they have the desired coatability properties (soluble at pH 5 to 6 and 40° C.) and remain in particulate form after coating. Some useful particulate dyes are described, for example, in U.S. Pat. No. 4,803,150 (Dickerson et al), incorporated herein by reference.

The useful amount of particulate dye in the elements is at least 0.5 g/m$^2$ on each side of the support, and preferably at least 0.7 g/m$^2$. Generally, the upper limit of such materials is 2 g/m$^2$, and preferably, less than 1.5 g/m$^2$ is used. Mixtures of particulate dyes can be used in one or more layers of the element.

The elements processed according to this invention also include one or more "desensitizers" in a silver halide emulsion layer(s) in order to provide additional visible and UV light protection. Conventional desensitizers can be used, as are known in photography and radiography. Various desensitizers are described, for example, in *Research Disclosure*, Vol. 308, December, 1989, publication 308119, Section III, the disclosure of which is incorporated herein by reference. Classes of such compounds include azomethine dyes (such as those described in U.S. Pat. No. 3,630,744 of Thiers et al).

Generally, the amount of desensitizer relative to the amount of silver halide in the element is adapted according to the particular silver halide emulsion used in the element, the particular desensitizer used, the ratio of gelatin or other colloid binder to silver halide, other components of the emulsions, and the procedure for preparing the emulsions. All of these factors would be well known to one skilled as a maker of silver halide emulsions. Thus, the amount should be effective to provide for a reduction in visible and UV light sensitivity, but no reduction in sensitivity to X-radiation.

More particularly, the useful amount of desensitizer in the elements is at least 1.5 mg/m$^2$ on each side of the support, and preferably at least 1.7 mg/m$^2$. Generally, the upper limit of such materials is 4 mg/m$^2$, and preferably, less than 3 mg/m$^2$ is used. Mixtures of desensitizers can be used in one or more layers of the element.

Advantageously, the processing method of this invention can be carried out using a processing kit that includes some or all of the components necessary for the method. Minimally, the processing kit would include the opaque black-and-white developing/fixing composition of this invention, and one or more of the other components, such as processing container, photographic element (one or more samples thereof), instructions for use, washing solution, fluid or composition metering devices, or any other conventional components of a photographic processing kit. All of the components can be suitably packaged in dry or liquid form in glass or plastic bottles, fluid-impermeable packets or vials. For processing dental films, the kit would typically include one or more ready-to-use dental film samples or packets.

The following example is provided for illustrative purposes, and not to be limiting in any manner.

MATERIALS AND METHODS FOR EXAMPLES

A radiographic film was prepared having the following layer arrangement and composition:

| Overcoat Layer | Gelatin | 1.35 g/m$^2$ |
|---|---|---|
| | Dye I* | 0.48 g/m$^2$ |
| | Dye II** | 0.16 g/m$^2$ |
| Emulsion Layer | AgBr Emulsion (tabular grains 2.0 µm by 0.13 µm) | 7.56 g Ag/m$^2$ |
| | Gelatin | 4.92 g/m$^2$ |
| | Dye I* | 0.16 g/m$^2$ |
| | Dye II** | 0.11 g/m$^2$ |
| | 6-chloro-4-nitrobenzotriazole | 2.1 mg/m$^2$ |
| Support | Polyethylene terephthalate | |
| Emulsion Layer | AgBr Emulsion (tabular grains 1.3 µm by 0.13 µm) | 7.56 g Ag/m$^2$ |

-continued

| | | |
|---|---|---|
| | Gelatin | 4.92 g/m² |
| | Dye I* | 0.16 g/m² |
| | Dye II** | 0.11 g/m² |
| | 6-chloro-4-nitrobenzotriazole | 2.1 mg/m² |
| Overcoat Layer | Gelatin | 1.35 g/m² |
| | Dye I* | 0.48 g/m² |
| | Dye II** | 0.16 g/m² |

Dye I* is bis[1-(4-carboxyphenyl)-3-methyl-2-pyrazolin-5-one-4] monomethineoxonol.
Dye II** is 4-(4-dimethylaminobenzylidene)-1-(4-carboxyphenyl)-3-methyl-2-pyrazolin-5-one.

The developing/fixing compositions of Table III were used in Examples 1 and 2. The pH values were adjusted in each solution by addition of sodium hydroxide, but any other suitable base can be used for this purpose.

TABLE III

| COMPONENT | Example 1 (mmol/l) | Example 2 (mmol/l) |
|---|---|---|
| Hydroquinone | 227 | 227 |
| Benzotriazole | 0 | 1.7 |
| 4-Hydroxymethyl-4-methyl-1-phenyl-3-pyrazolidone | 12 | 12 |
| Sodium sulfite | 0 | 400 |
| Potassium bromide | 33.6 | 40 |
| Sodium thiocyanate | 925 | 925 |
| Sodium thiosulfate | 0 | 475 |
| Potassium carbonate | 0 | 290 |
| pH | 11.0 | 10.5 |

Example 1

This example was used to determine the optimum level of carbon black in the monobath composition of this invention.

Samples of the radiographic film described above were exposed to roomlight (500 Lux fluorescent lighting) for 60 seconds, then processed using the various processing solutions noted above at room temperature and under roomlight using the following processing protocol:

| | |
|---|---|
| Development/fixing | 60 seconds |
| Washing (water) | 20 seconds |

Carbon black was added to the developing/fixing composition at amounts of 0.5–2 weight %. The sensitometric results obtained using conventional sensitometric methods are shown in TABLE IV below. The various density values were compared to those obtained with 0.5 weight % carbon black. Hence, the results are shown as density "differences".

TABLE IV

| % Carbon black | Dmin difference | Mid-range Density difference | Dmax difference |
|---|---|---|---|
| 1% | +0.27 | +0.15 | −0.06 |
| 2% | +0.77 | +0.87 | −0.9 |

These results show that the composition containing 2% carbon black brought about significantly higher Dmin due to carbon black visibly imbedded within the film, and incomplete fixing. It gave a higher Dmin with about the same Dmax. The composition with 1% carbon black provided adequate roomlight protection with some process variability, and some loss in Dmax. The composition with only 0.5% carbon black also gave adequate roomlight protection.

Example 2

A different monobath composition (1% carbon black) was used in the same process described in Example 1, and compared to the use of a monobath composition having the same components but without carbon black.

Sensitometric results after exposure and processing are shown in TABLE V below. Dmin, speed and dynamic range have conventional meanings.

TABLE V

| Composition | Conditions | Dmin | Speed | Dynamic Range |
|---|---|---|---|---|
| Invention | Roomlight | 1.80 | 192 | 1.84 |
| Control | Safe light | 1.48 | 195 | 1.93 |
| Control | Roomlight | 6.22 | — | 0 |

These results show that processing in roomlight without carbon black gave complete exposure. Carbon black was not needed for the Control process carried out under safelight conditions, but the practice of the Invention provided roomlight protection as shown by the relatively low Dmin.

The invention has been described in detail with particular reference to preferred embodiments thereof, but it will be understood that variations and modifications can be effected within the spirit and scope of the invention.

We claim:

1. A black-and-white developing/fixing composition having a pH of from about 10 to about 12.5, and comprising:
    at least 0.05 mol/l of a black-and-white developing agent,
    up to 0.5 mol/l of a sulfite,
    at least 0.5 mol/l of a fixing agent other than a sulfite, and
    at least 0.5 weight % of a particulate opacifying agent.

2. The composition of claim 1 having a pH of from about 10.5 to about 12.

3. The composition of claim 1 further comprising an auxiliary co-developing agent and a sequestering agent.

4. The composition of claim 1 wherein said black-and-white developing agent is present at a concentration of from about 0.05 to about 0.5 mol/l, said sulfite is present at a concentration of from 0 to about 0.5 mol/l, and said fixing agent is present at a concentration of from about 0.5 to about 3 mol/l.

5. The composition of claim 1 wherein said particulate opacifying agent is present at from about 0.5 to about 5 weight %.

6. The composition of claim 1 wherein said particulate opacifying agent is carbon black.

7. The composition of claim 6 wherein said black-and-white developing agent is hydroquinone, and said fixing agent is a thiocyanate, thiosulfate or a mixture thereof.

* * * * *